United States Patent
Lin

(10) Patent No.: US 8,300,735 B2
(45) Date of Patent: Oct. 30, 2012

(54) WIRELESS SIGNAL RECEIVING METHOD AND RECEIVER FOR IN-PHASE TO QUADRATURE (I/Q) MISMATCH CALIBRATION

(75) Inventor: I-Hung Lin, Taipei (TW)

(73) Assignee: Richwave Technology Corp., Taipei (TW)

( * ) Notice: Subject to any disclaimer, the term of this patent is extended or adjusted under 35 U.S.C. 154(b) by 463 days.

(21) Appl. No.: 12/623,537

(22) Filed: Nov. 23, 2009

(65) Prior Publication Data

US 2010/0278285 A1 Nov. 4, 2010

(30) Foreign Application Priority Data

Apr. 30, 2009 (TW) ............................ 98114350 A

(51) Int. Cl.
*H03K 9/06* (2006.01)
(52) U.S. Cl. ........................................................ 375/322
(58) Field of Classification Search .................. 375/322
See application file for complete search history.

(56) References Cited

U.S. PATENT DOCUMENTS

| | | | | | |
|---|---|---|---|---|---|
| 5,949,821 | A * | 9/1999 | Emami et al. | ............... | 375/235 |
| 6,009,317 | A * | 12/1999 | Wynn | ............... | 455/296 |
| 6,044,112 | A * | 3/2000 | Koslov | ............... | 375/235 |
| 6,330,290 | B1 * | 12/2001 | Glas | ............... | 375/324 |
| 7,116,728 | B2 * | 10/2006 | McCune, Jr. | ............... | 375/324 |
| 7,158,586 | B2 * | 1/2007 | Husted | ............... | 375/324 |
| 7,203,614 | B2 * | 4/2007 | Chang | ............... | 702/106 |
| 7,362,826 | B2 * | 4/2008 | Willingham | ............... | 375/327 |
| 7,376,170 | B2 * | 5/2008 | Scheck | ............... | 375/130 |
| 7,443,783 | B2 * | 10/2008 | DeChamps et al. | ............... | 370/208 |
| 7,830,954 | B2 * | 11/2010 | Welz et al. | ............... | 375/219 |
| 8,036,319 | B2 * | 10/2011 | Arambepola et al. | ............... | 375/329 |
| 2004/0146121 | A1 * | 7/2004 | Brown et al. | ............... | 375/322 |
| 2004/0203472 | A1 * | 10/2004 | Chien | ............... | 455/68 |
| 2004/0219884 | A1 * | 11/2004 | Mo et al. | ............... | 455/67.11 |
| 2005/0078776 | A1 * | 4/2005 | Song et al. | ............... | 375/345 |
| 2005/0123067 | A1 * | 6/2005 | Kim et al. | ............... | 375/298 |
| 2005/0148304 | A1 * | 7/2005 | Jerng | ............... | 455/75 |
| 2005/0157815 | A1 * | 7/2005 | Kim et al. | ............... | 375/302 |
| 2006/0009180 | A1 * | 1/2006 | Xu et al. | ............... | 455/226.1 |
| 2006/0067424 | A1 * | 3/2006 | Wolf | ............... | 375/296 |
| 2006/0203901 | A1 * | 9/2006 | Tan et al. | ............... | 375/233 |
| 2007/0080835 | A1 * | 4/2007 | Maeda et al. | ............... | 341/120 |
| 2008/0205502 | A1 * | 8/2008 | Lee et al. | ............... | 375/226 |

* cited by examiner

Primary Examiner — Juan A Torres
(74) Attorney, Agent, or Firm — Thomas|Kayden

(57) ABSTRACT

A receiver receiving a Radio Frequency (RF) signal and generating a baseband signal is provided. An RF module receives the RF signal and down convert the RF signal according to a first oscillation frequency to generate an Intermediate Frequency (IF) signal. An IF module is coupled to the RF module and arranged to receive the IF signal and down convert the IF signal according to a second oscillation frequency to generate the baseband signal. A calibration module is coupled to the RF module and arranged to calculate the IF signal according to a third oscillation frequency to detect an I/Q mismatch, and generate an adjustment signal, accordingly, to calibrate the I/O mismatch.

23 Claims, 5 Drawing Sheets

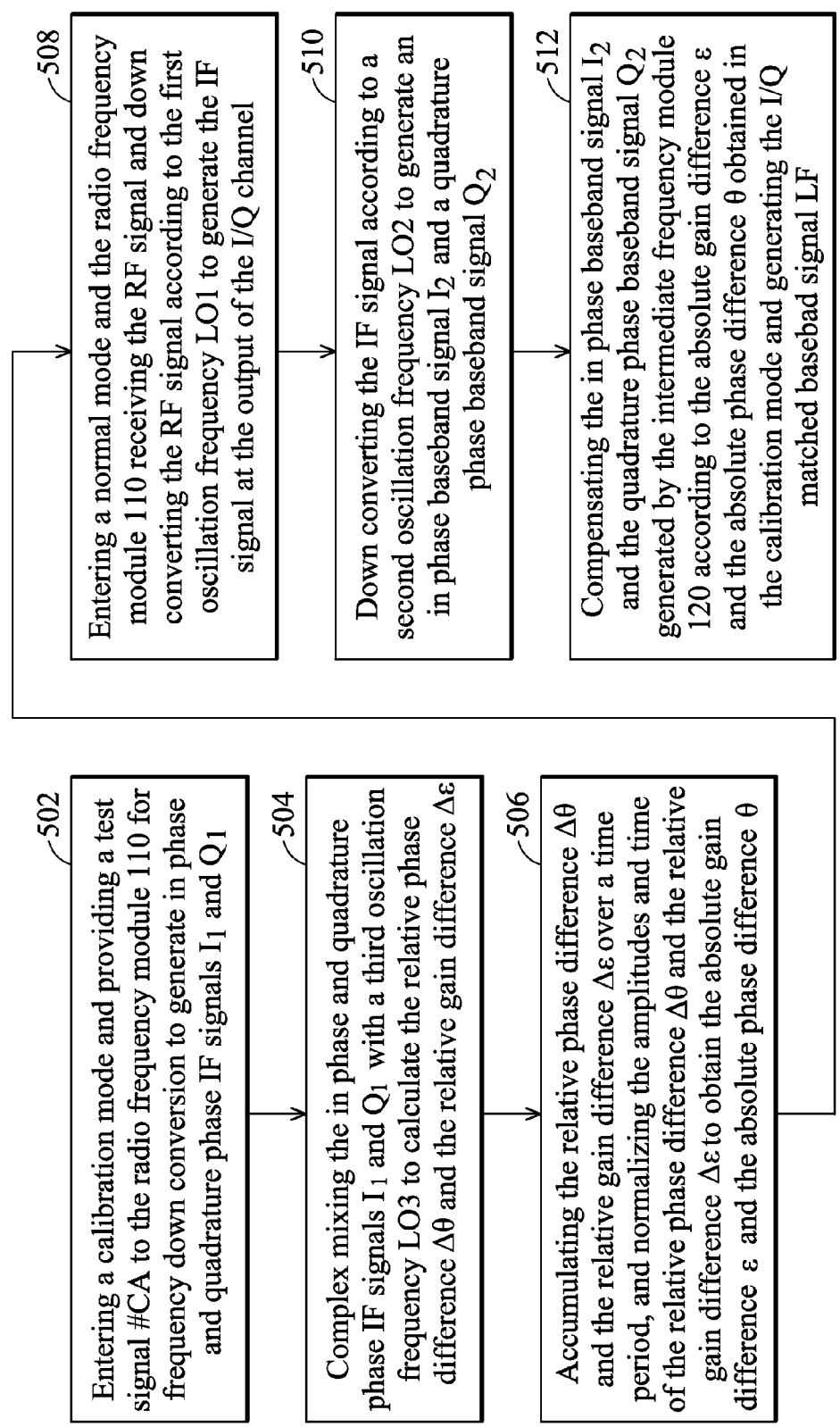

WIRELESS SIGNAL RECEIVING METHOD AND RECEIVER FOR IN-PHASE TO QUADRATURE (I/Q) MISMATCH CALIBRATION

CROSS REFERENCE TO RELATED APPLICATIONS

This Application claims priority of Taiwan Patent Application No. 098114350, filed on Apr. 30, 2009, the entirety of which is incorporated by reference herein.

BACKGROUND OF THE INVENTION

1. Field of the Invention

The invention relates to a wireless communication technique and more particularly to an in-phase to quadrature (I/Q) mismatch correction technique utilized by a receiver.

2. Description of the Related Art

FIG. 1 shows a conventional receiver 100. Receiver 100 is designed based on the Weaver structure, including mainly a radio frequency module 110 and an intermediate frequency module 120. The radio frequency (RF) module 110 receives a radio frequency signal RF and down converts the radio frequency signal RF into an intermediate frequency signal IF, and the intermediate frequency module 120 further down converts the intermediate frequency signal IF into a baseband signal LF. The signal path is divided into an in phase path (I-path) and a quadrature phase path (Q-path). As an example, in the radio frequency module 110, a first Phase Locked Loop (PLL) PLL1 provides oscillation signals LO1I and LO1Q oscillating at a first oscillation frequency LO1. The first mixer 102a and the second mixer 102b respectively mix the oscillation signals LO1I and LO1Q with the radio frequency signal RF. The obtained mixed signals are passed to the first low pass filter 104a and the second low pass filter 104b to generate the intermediate frequency signal IF, which comprises the in phase intermediate frequency signal and the quadrature phase intermediate frequency signal $Q_1$. In the intermediate frequency module 120, the second phase locked loop PLL2 provides oscillation signals LO2I and LO2Q oscillating at a second oscillation frequency LO2 to the third mixer 106a and the fourth mixer 106b. The in phase and quadrature phase intermediate frequency signals $I_1$ and $Q_1$ are respectively mixed by the third mixer 106a and the fourth mixer 106b. The obtained in phase and quadrature phase baseband signals $I_2$ and $Q_2$ are added together by the adder 108 to obtain the output baseband signal LF.

The main purpose of the receiver 100 is to filter out the image (so-called image rejection) generated in the down conversion process. Ideally, when the in phase path circuit and the quadrature phase path circuit are perfectly matched, the image can be perfectly rejected. Generally, when the efficiency index, so-called Image Rejection Ratio (IRR), is higher, the image rejection performance is better. However, when implementing the circuit in practice, due to several imperfect factors, amplitude mismatch, gain mismatch and phase mismatch usually exist between the in phase path and the quadrature phase path, which is called I/Q mismatch. The I/Q mismatch seriously degrades the performance of image rejection. The gain mismatch of a circuit normally ranges between +−10%, and the phase mismatch ranges between about +−5%. In order to improve the impairment caused by I/Q mismatch, an additional I/Q calibration circuit is adopted in the conventional design to detect the mismatch between the in phase path and the quadrature phase path and generate a corresponding compensation value. As an example, most of the detection and calibration methods use an adaptive circuit structure to detect and compensate the mismatch. The advantage of the adaptive circuit structure is that design thereof is flexible and it is able to eliminate the factors influencing the I/Q mismatch. However, the adaptive circuit structure normally requires a lot of time for training, for satisfactory compensation results. In addition, in order to detect mismatch, an additional test signal #CAL is needed. Because the signal to noise ratio (SNR) requirement of the test signal #CAL is usually high, additional costs are required to improve the quality of the SNR.

BRIEF SUMMARY OF THE INVENTION

Receivers and wireless signal receiving methods are provided. An exemplary embodiment of a receiver for receiving a Radio Frequency (RF) signal and generating a baseband signal comprises an RF module, an IF module and a calibration module. The RF module receives the RF signal and down converts the RF signal according to a first oscillation frequency to generate an Intermediate Frequency (IF) signal. The IF module receives the IF signal and down convert the IF signal according to a second oscillation frequency to generate the baseband signal. The calibration module calculates the IF signal according to a third oscillation frequency to detect an I/Q mismatch, and generates an adjustment signal, accordingly, to calibrate the I/O mismatch. The third oscillation frequency is an integer multiple of the second oscillation frequency, as an example, the integer is 16. The receiver further comprises a test signal generator. In a calibration mode, the test signal generator generates a test signal to the RF module to emulate the RF signal, wherein the test signal comprises a frequency and an amplitude The RF module further comprises: a first Phase Locked Loop (PLL), a first mixer, a first Low Pass Filter (LPF) and a second mixer. The first PLL generates a first in phase oscillation signal and a first quadrature phase oscillation signal having the first oscillation frequency. The first mixer mixes the first in phase oscillation signal with the test signal. The first LPF filters a mixed result of the first mixer to output an in phase IF signal. The second mixer mixes the first quadrature phase oscillation signal with the test signal. The second LPF filters a mixed result of the second mixer to output a quadrature phase IF signal.

The IF module comprises a second PLL, a third mixer, a fourth mixer and a compensator. The second PLL generates a second in phase oscillation signal and a second quadrature phase oscillation signal having the second oscillation frequency. The third mixer mixes the second in phase oscillation signal with the in phase IF signal to generate an in phase baseband signal. The fourth mixer mixes the second quadrature phase oscillation signal with the quadrature phase IF signal to generate a quadrature phase baseband signal. The compensator receives the in phase baseband signal and the quadrature phase baseband signal, and calibrates the I/Q mismatch according to the adjustment signal and generates the baseband signal, accordingly.

The calibration module comprises a first digital converter, a second digital converter, a complex mixer and a statistic module. The first digital converter converts the in phase IF signal to an in phase digital signal. The second digital converter converts the quadrature phase IF signal to a quadrature phase digital signal. The complex mixer mixes the in phase digital signal and the quadrature phase digital signal with the third oscillation frequency to obtain a relative gain difference and a relative phase difference. The statistic module accumulates the relative gain difference and the relative phase difference to calculate the I/Q mismatch that includes an absolute gain difference and an absolute phase difference.

The compensator receives the in phase baseband signal, quadrature phase baseband signal, absolute gain difference and the absolute phase difference, and obtains an in phase compensation result and a quadrature phase compensation result as follows:

$$I'_2 = I_2/(1+\epsilon)$$

$$Q'_2 = -I_2 \cdot \tan\theta/(1+\epsilon) + Q_2/\cos\theta$$

where $\epsilon$ represents the absolute gain difference, $I_2$ represents the in phase baseband signal, $I'_2$ represents the in phase compensation result and $Q'_2$ represents the quadrature phase compensation result. The compensator further comprises an adder to add the in phase compensation result and quadrature phase compensation result together to generate the baseband signal.

The complex mixer comprises a first multiplier, a second multiplier, a first adder and a third multiplier. The first multiplier mixes a third in phase oscillation signal having the third oscillation frequency with the in phase digital signal. The second multiplier mixes a third quadrature phase oscillation signal having the third oscillation frequency with the quadrature phase digital signal. The first adder adds mixed results of the first multiplier and the second multiplier together. The third multiplier multiplies a summation of the first adder by the in phase digital signal to generate the relative gain difference.

The statistic module comprises a first accumulator, a first normalizer and a first scaler. The first accumulator accumulates all of the relative gain differences generated within a time period, wherein the time period relates to the frequency of the test signal. The first normalizer normalizes the accumulated result of the first accumulator according to the amplitude of the test signal. The first scaler adjusts a normalized result of the first normalizer according to a ratio of the third oscillation frequency to the second oscillation frequency to generate the absolute gain difference.

Similarly, to eliminate the phase difference, the calibration module further comprises a fourth multiplier, a fifth multiplier, a second adder and a sixth multiplier. The fourth multiplier mixes the third in phase oscillation signal with the quadrature phase IF signal. The fifth multiplier mixes the third quadrature phase oscillation signal with the in phase IF signal. The second adder adds mixed results of the fourth multiplier and the fifth multiplier together. The sixth multiplier multiplies a summation of the second adder by the in phase digital signal to generate the relative phase difference. The statistic module comprises a second accumulator, a second normalizer and a second scaler. The second accumulator accumulates all of the relative phase differences generated within a time period, wherein the time period relates to the frequency of the test signal. The second normalizer normalizes the accumulated result of the second accumulator according to the amplitude of the test signal. The second scaler adjusts a normalized result of the second normalizer according to a ratio of the third oscillation frequency to the second oscillation frequency to generate the absolute phase difference.

An exemplary embodiment of a wireless signal receiving method for receiving a Radio Frequency (RF) signal and generating a baseband signal via an I/Q channel comprises: in a calibration mode: providing a test signal to an input of the I/Q channel, wherein the test signal has a frequency and an amplitude; down converting the test signal according to a first oscillation frequency to generate an Intermediate Frequency (IF) signal at an output of the I/Q channel; and mixing the IF signal with a third oscillation frequency and performing an accumulating operation to detect an I/Q mismatch; and in a normal mode: receiving the RF signal and down converting the RF signal according to the first oscillation frequency to generate the IF signal at the output of the I/Q channel; and down converting the IF signal according to a second oscillation frequency and calibrating the I/Q mismatch to generate the baseband signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 5 shows a flow chart of a wireless signal receiving method according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
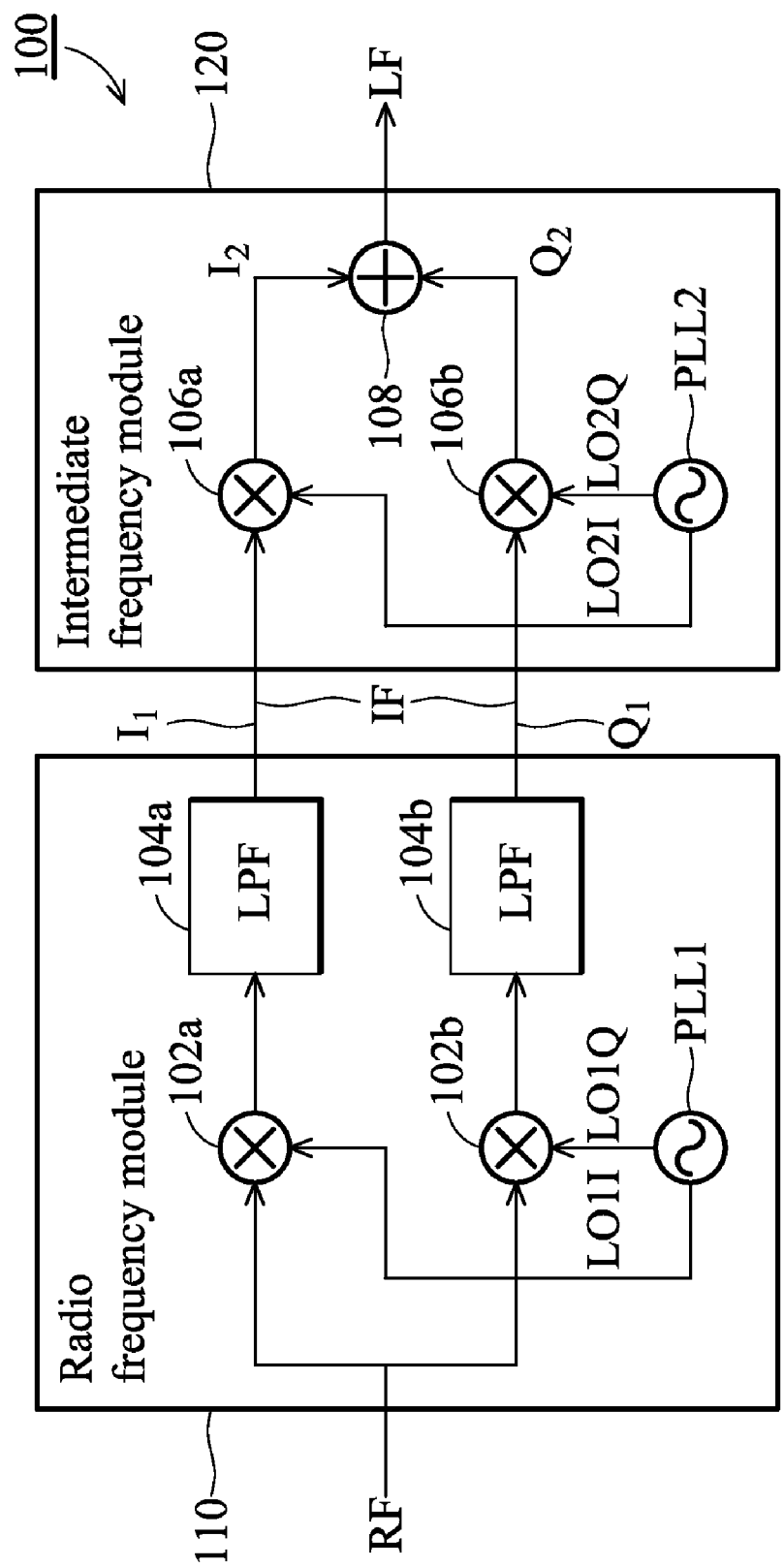
FIG. 1 shows a conventional receiver.
Figure 2:
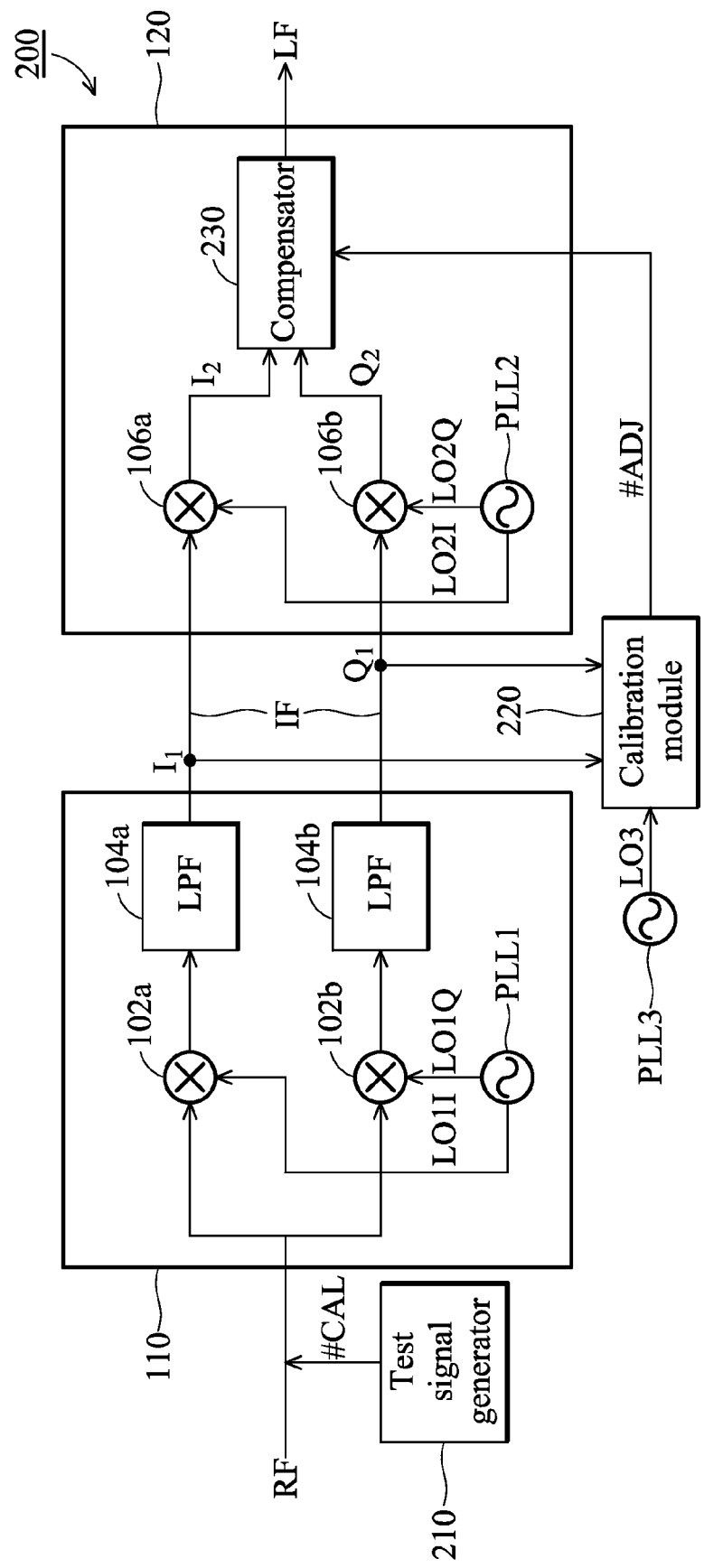
FIG. 2 shows a receiver 200 according to an embodiment of the invention.

FIG. 2 shows a receiver 200 according to an embodiment of the invention. In addition to the radio frequency module 110 and the intermediate frequency module 120 as previously described, a test signal generator 210, a calibration module 220 and a compensator 230 are further included in the receiver 200. The compensator 230 is used in replace of the adder 108 as shown in FIG. 1. The receiver operates in two modes, including a calibration mode and a normal mode. The test signal generator 210 and the calibration module 220 operate in the calibration mode and the compensator 230, the radio frequency module 110 and the intermediate frequency module 120 operate in the normal mode. In the calibration mode, the test signal generator 210 generates a test signal #CAL to emulate the radio frequency signal RF for the radio frequency module 110 to perform frequency down conversion. Basically, the test signal #CAL is a known value, having a known frequency and a known amplitude. After receiving the test signal #CAL, the radio frequency module 110 generates an Intermediate Frequency (IF) signal, represented by the in phase IF signal $I_1$ and the quadrature phase IF signal $Q_1$. According to an embodiment of the invention, the calibration module 220 is coupled to the radio frequency module 110, mixes and performs an accumulation operation on the IF signal generated by the radio frequency module 110 according to a third oscillation frequency LO3 provided by the third phase locked loop PLL3 to detect the I/Q mismatch between the in phase path and the quadrature phase path. After detecting the I/Q mismatch, the calibration module 220 generates an adjustment signal #ADJ and transmits the adjustment signal #ADJ to the compensator 230. The compensator 230 operates in the normal mode and calibrates the I/Q mismatch between the in phase path and the quadrature phase according to the adjustment signal #ADJ and finally outputs the calculated baseband signal LF. As shown in FIG. 2, the calibration module 220 may be coupled to the output of the radio frequency module 110, or any node on the in phase and the quadrature phase paths. The calibration module 220 uses the third oscillation frequency LO3 provided by the third phase locked loop PLL3. The third oscillation frequency LO3 may be at least two times that of the second oscillation frequency LO2. According to a preferable embodiment of the invention, the third oscillation frequency LO3 may be 16 times that of the second oscillation frequency LO2. Note that the frequency relationship between the radio frequency signal RF and the intermediate frequency signal IF may be flexibly designed according to different wireless communication applications and the invention should not limited thereto. Also note that the second oscillation frequency LO2 and the third oscillation frequency LO3 may not be limited to be independently generated by two different PLLs. One PLL may also be used to generate the second and third oscillation frequency LO2 and LO3 via an up conversion method. For detailed description of sharing of one PLL, reference may be made to the conventional techniques and are omitted here for brevity. Methods for implementing the calibration module 220 and the compensator 230 will be introduced in more detail in the following paragraphs.

Figure 3:
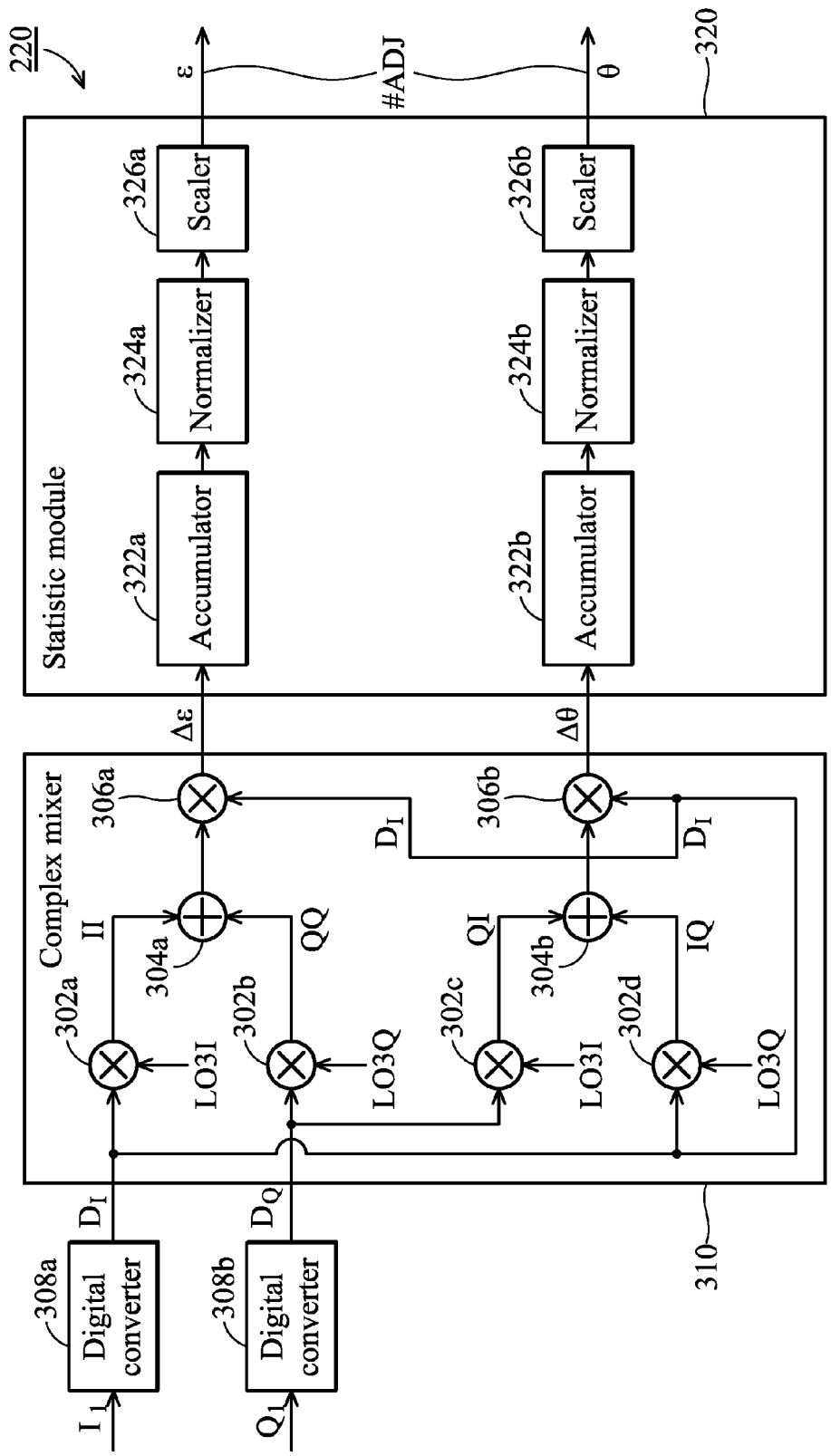
FIG. 3 shows an embodiment of the calibration module 220 shown in FIG. 2.

FIG. 3 shows an embodiment of the calibration module 220 shown in FIG. 2. In the in phase path, a first digital converter 308a is coupled to the first LPF 104a shown in FIG. 2 and converts the in phase IF signal $I_1$ to an in phase digital signal $D_I$. In the quadrature phase path, a second digital converter 308b is coupled to the second LPF 104b shown in FIG. 2 and converts the quadrature phase IF signal $Q_1$ to a quadrature phase digital signal $D_Q$. Next, a complex mixer 310 receives the in phase digital signal $D_I$ and the quadrature phase digital signal $D_Q$ from the first digital converter 308a and the second digital converter 308b, and mixes the in phase digital signal $D_I$ and the quadrature phase digital signal $D_Q$ with the third oscillation frequency LO3 provided by the third phase locked loop PLL3 to obtain a relative gain difference $\Delta\epsilon$ and a relative phase difference $\Delta\theta$. Specifically, the third oscillation frequency LO3 comprises the third in phase oscillation signal LO3I and the third quadrature phase oscillation signal LO3Q, having a 90 degree phase difference. Both of the third in phase oscillation signal LO3I and the third quadrature phase oscillation signal LO3Q are provided to a corresponding element. Note that the method for generating in phase and quadrature phase oscillation signals is well known to those with ordinary skill in the art, and is omitted here for brevity. The complex mixer 310 outputs the obtained relative gain difference $\Delta\epsilon$ and the relative phase difference $\Delta\theta$ to a statistic module 320. The statistic module 320 accumulates the relative gain difference $\Delta\epsilon$ and the relative phase difference $\Delta\theta$, respectively, to calculate the I/Q mismatch. In the embodiments of the invention, the relative gain difference $\Delta\epsilon$ and the relative phase difference $\Delta\theta$ are important for calculating I/Q mismatch.

Specifically, the complex mixer 310 performs complex operations to extract the relative gain difference $\Delta\epsilon$ and the relative phase difference $\Delta\theta$ from the in phase IF signals $I_1$ and $Q_1$. The complex mixer 310 comprises four multipliers 302a, 302b, 302c and 302d. The multiplier 302a mixes the in phase digital signal DI with a third in phase oscillation signal LO3I having the third oscillation frequency LO3 to generate a mixed signal II. The multiplier 302b mixes the quadrature phase digital signal DQ with a third quadrature phase oscillation signal LO3Q having the third oscillation frequency LO3 to generate a mixed signal QQ. The multipliers 302c and 302d operate in reverse manners. The multiplier 302c mixes the quadrature phase digital signal DQ with the third in phase oscillation signal LO3I to generate a mixed signal QI. The multiplier 302d mixes the in phase digital signal DI with the third quadrature phase oscillation signal LO3Q to generate a mixed signal IQ. A first adder 304a adds the mixed signals II and QQ generated by the multipliers 302a and 302b together and outputs the summation to the multiplier 306a. The multiplier 306a multiplies the output of the first adder 304a by the in phase digital signal DI to generate the relative gain difference $\Delta\epsilon$. Similarly, a second adder 304b adds the mixed signals QI and IQ together and outputs the summation to the multiplier 306b. The multiplier 306b multiplies the output of the second adder 304b by the in phase digital signal DI to generate the relative phase difference $\Delta\theta$. In the embodiment of the invention, the relative gain difference $\Delta\epsilon$ and the relative phase difference $\Delta\theta$ comprise the mixed composite component of the in phase IF signal $I_1$ and the quadrature phase IF signal $Q_1$, for example, the frequency components at frequency (LO3+(LO1−LO2)) and (LO3−(LO1−LO2)). The purpose of the aforementioned operations is to perform frequency up conversion via the third oscillation frequency LO3, so as to pass the mismatch between the in phase and quadrature phase IF signals $I_1$ and $Q_1$ in a form of energy to the statistic module 320 for a subsequent accumulation operation.

In the statistic module 320, the operation thereof may be divided into three steps, including accumulation, amplitude normalization and time normalization. The relative gain difference $\Delta\epsilon$ generated by the multiplier 306a is output to a first accumulator 322a. The first accumulator 322a accumulates all of the relative gain differences $\Delta\epsilon$ generated within a time period, wherein the time period relates to the frequency of the test signal #CAL. Next, the first normalizer 324a normalizes the accumulated result of the first accumulator 322a according to the amplitude of the test signal #CAL. The first scaler 326a is coupled to the first normalizer 324a and adjusts a normalized result of the first normalizer 324a according to a ratio of the third oscillation frequency LO3 to the second oscillation frequency LO2 to generate the absolute gain difference $\epsilon$ per time unit. Similarly, when calculating the absolute gain difference $\epsilon$, the second accumulator 322b accumulates all of the relative phase differences $\Delta\theta$ generated within a time period, wherein the time period relates to the frequency of the test signal #CAL. The second normalizer 324b normalizes the accumulated result of the second accumulator 322b according to the amplitude of the test signal #CAL. The second scaler 326b adjusts a normalized result of the second normalizer 324b according to a ratio of the third oscillation frequency LO3 to the second oscillation frequency LO2 to generate the absolute phase difference $\theta$ per time unit.

Figure 4:
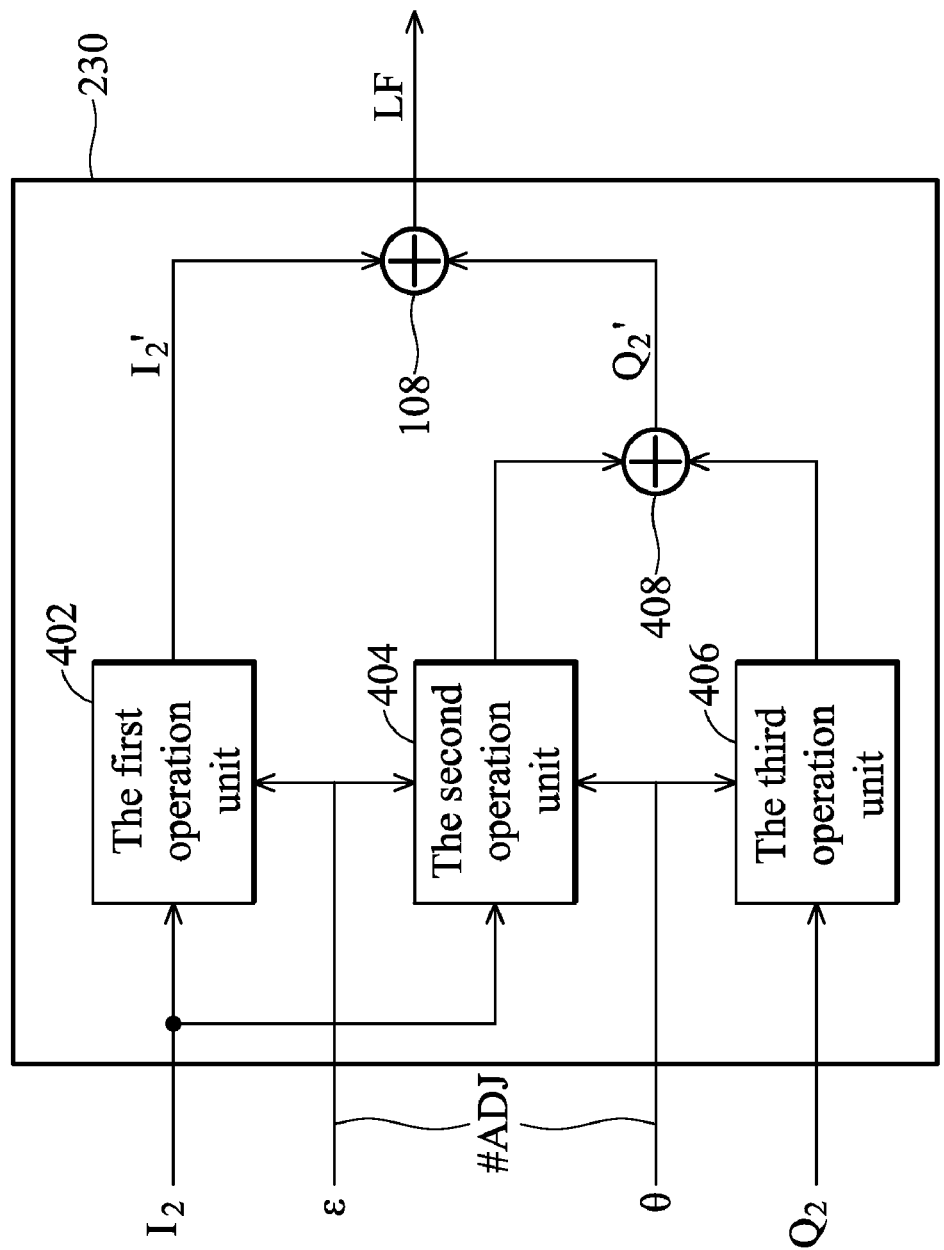
FIG. 4 is an embodiment of a compensator 230 as shown in FIG. 2.

FIG. 4 is an embodiment of a compensator 230 as shown in FIG. 2. In the embodiment, the adjustment signal #ADJ received by compensator 230 is the absolute gain difference $\epsilon$ and the absolute phase difference $\theta$ obtained by the statistic module 320 as shown in FIG. 3. In the intermediate frequency module 120, the third mixer 106a and the fourth mixer 106b first down convert the in phase and quadrature phase IF signal $I_1$ and $Q_1$ to the in phase and quadrature phase baseband signal $I_2$ and $Q_2$ according to the second oscillation signals LO2I and LO2Q. Suppose that in an ideal condition, the ideal value of in phase and quadrature phase baseband signals is represented as follows:

$$I_{ideal} = A \cos(wt+\delta) \quad (1)$$

$$Q_{ideal} = A \sin(wt+\delta) \quad (2)$$

Thus, the in phase and quadrature phase baseband signals having phase mismatch and gain mismatch therebetween may be represented as follows:

$$I_{mismatch} = A(1+\epsilon)\cos(wt+\delta) \quad (3)$$

$$Q_{mismatch} = A\sin(wt+\delta+\theta) \quad (4)$$

Equation (4) may be simplified according to equations (1) to (3) to obtain $$Q_{mismatch} = Q_{ideal}\cos\theta + I_{ideal}\sin\theta \quad (5)$$

Therefore, the ideal values $I_{ideal}$ and $Q_{ideal}$ as shown in equations (1) and (2) may be obtained from the $I_{mismatch}$ and $Q_{mismatch}$ in equations (3) and (4) according to the absolute gain difference $\theta$ and the absolute phase difference $\theta$ as follows:

$$I_{ideal} = I_{mismatch}/(1+\epsilon) \quad (6)$$

$$Q_{ideal} = \tan\theta \cdot I_{mismatch}/(1+\epsilon) + Q_{mismatch}/\cos\theta \quad (7)$$

According to equations (6) and (7), the compensator 230 compensates the in phase and quadrature phase baseband signals $I_2$ and $Q_2$ to obtain an in phase compensation result $I_2$ and a quadrature phase compensation result $Q'_2$ as shown below:

$$I'_2 = I_2/(1+\epsilon) \quad (8)$$

$$Q'_2 = -I'_2 \cdot \tan\theta/(1+\epsilon) + Q_2/\cos\theta \quad (9)$$

Finally, the adder 108 in the compensator 230 adds the in phase compensation result $I'_2$ and the quadrature phase compensation result $Q'_2$ together to generate the baseband signal LF. Because equations (8) and (9) both use the basic four fundamental arithmetic operations, the in phase compensation result $I'_2$ and the quadrature phase compensation result $Q'_2$ may be simply obtained by substituting the in phase baseband signal $I_2$, the quadrature phase baseband signal $Q_2$, the absolute gain difference $\epsilon$ and the absolute phase difference $\theta$ into equations (8) and (9). Therefore, the circuit implemented in practice should not be limited to any specific forms. As an example, the comparator as shown in FIG. 4 may comprise a first operation unit 402 to calculate the in phase compensation result $I'_2$ according to the in phase baseband signal $I_2$ and the relative gain difference $\epsilon$. The quadrature phase compensation result $Q'_2$ may also be obtained by the second operation unit 404 and the third operation unit 406. The second operation unit 404 receives the in phase baseband signal $I_2$, the absolute gain difference $\epsilon$ and the absolute phase difference $\theta$, and calculates a value of $(-I_2 \cdot \tan\theta/(1+\epsilon))$. The third operation unit 406 receives the quadrature phase baseband signal $Q_2$ and the absolute phase difference $\theta$, and calculates a value of $(Q_2/\cos\theta)$. The adder 408 adds the output of the second and third operation units 404 and 406 together to obtain the quadrature phase compensation result $Q'_2$. Basically, the baseband signal LF output by the adder 108 is the preferable calibration result.

FIG. 5 shows a flow chart of a wireless signal receiving method according to an embodiment of the invention. After the receiver 200 is activated, a calibration mode is entered and a test signal #CAL is provided by the test signal generator 210 to the radio frequency module 110 in step 502 for frequency down conversion to generate in phase and quadrature phase IF signals $I_1$ and $Q_1$. The test signal #CAL has a known frequency and known amplitude. The mismatch between the in phase path and the quadrature phase path is reflected in the in phase and quadrature phase IF signals $I_1$ and $Q_1$. In step 504, the complex mixer 310 in the calibration module 220 complex mixes the in phase and quadrature phase IF signals $I_1$ and $Q_1$ with a third oscillation frequency LO3 to calculate the relative phase difference $\Delta\theta$ and the relative gain difference $\Delta\epsilon$. In step 506, the statistic module 320 accumulates the relative phase difference $\Delta\theta$ and the relative gain difference $\Delta\epsilon$ over a time period, and normalizes the amplitudes and time of the relative phase difference $\Delta\theta$ and the relative gain difference $\Delta\theta$ to obtain the absolute gain difference $\epsilon$ and the absolute phase difference $\theta$. In step 508, a normal mode is entered and the radio frequency module 110 receives the RF signal and down converts the RF signal according to the first oscillation frequency LO1 to generate the IF signal at the output of the I/Q channel. Next in step 510, the intermediate frequency module 120 down converts the IF signal according to a second oscillation frequency LO2 to generate an in phase baseband signal $I_2$ and a quadrature phase baseband signal $Q_2$. In step 512, the compensator 230 compensates the in phase baseband signal $I_2$ and the quadrature phase baseband signal $Q_2$ generated by the intermediate frequency module 120 according to the absolute gain difference $\epsilon$ and the absolute phase difference $\theta$ obtained in the calibration mode, and finally generates the I/Q matched baseband signal LF. In the embodiments of the invention, the third oscillation frequency LO3 is a predetermined value, which may be as high as 16 times that of the second oscillation frequency LO2. However, basically, the invention may be implemented when the third oscillation frequency LO3 exceeds two times that of the second oscillation frequency LO2. The receiver 200 should not be limited to the design based on the Weaver structure, and the calibration module 220 for calculating the I/Q mismatch may be designed according to the structure of the receiver 200 and does not necessarily have to be coupled to the output of the radio frequency module 110. The adjustment signal #ADJ generated by the calibration module 220 in the embodiment of the invention is represented in a digital form. However, the adjustment signal #ADJ may also be converted to an analog form via a conventional digital to analog converter (DAC) so as to adjust the analog circuits in the receiver 200. In other words, instead of being implemented as a digital circuit in the intermediate frequency module 120, the comparator 230 may also be implemented as an analog circuit in the radio frequency module 110 and the invention should not be limited thereto. The receiver 200 may be used in a variety of kinds of wireless communication applications, such as a wireless network, a cellular network, or a Bluetooth communications network.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A receiver receiving a Radio Frequency (RF) signal and generating a baseband signal, comprising:

an RF module, arranged to receive the RF signal and down convert the RF signal according to a first oscillation frequency to generate an Intermediate Frequency (IF) signal;

an IF module, coupled to the RF module and arranged to receive the IF signal and down convert the IF signal according to a second oscillation frequency to generate the baseband signal; and a calibration module, coupled to the RF module and arranged to calculate the IF signal according to a third oscillation frequency to detect an in-phase to quadrature (I/Q) mismatch, and generate an adjustment signal, accordingly, to calibrate the I/Q mismatch.

2. The receiver as claimed in claim 1, wherein the third oscillation frequency is an integer multiple of the second oscillation frequency, and wherein the integer exceeds 2.

3. The receiver as claimed in claim 2, wherein the integer is 16.

4. The receiver as claimed in claim 1, further comprising a test signal generator, coupled to an input of the RF module, wherein in a calibration mode, the test signal generator generates a test signal to the RF module to emulate the RF signal, wherein the test signal comprises a frequency and an amplitude.

5. The receiver as claimed in claim 4, wherein the RF module further comprises:
 a first Phase Locked Loop (PLL), arranged to generate a first in phase oscillation signal and a first quadrature phase oscillation signal having the first oscillation frequency;
 a first mixer, coupled to the first PLL and arranged to mix the first in phase oscillation signal with the test signal;
 a first Low Pass Filter (LPF), coupled to the first mixer and arranged to filter a mixed result of the first mixer to output an in phase IF signal as a component of the IF signal;
 a second mixer, coupled to the first PLL and arranged to mix the first quadrature phase oscillation signal with the test signal; and
 a second LPF, coupled to the second mixer and arranged to filter a mixed result of the second mixer to output a quadrature phase IF signal as a component of the IF signal.

6. The receiver as claimed in claim 5, wherein the IF module comprises:
 a second PLL, arranged to generate a second in phase oscillation signal and a second quadrature phase oscillation signal having the second oscillation frequency;
 a third mixer, coupled to the second PLL and arranged to mix the second in phase oscillation signal with the in phase IF signal to generate an in phase baseband signal;
 a fourth mixer, coupled to the second PLL and arranged to mix the second quadrature phase oscillation signal with the quadrature phase IF signal to generate a quadrature phase baseband signal; and
 a compensator, coupled to the third mixer and the fourth mixer and arranged to receive the in phase baseband signal and the quadrature phase baseband signal, and calibrate the I/Q mismatch according to the adjustment signal and generate the baseband signal, accordingly.

7. The receiver as claimed in claim 6, wherein the calibration module comprises:
 a first digital converter, coupled to the first LPF and arranged to convert the in phase IF signal to an in phase digital signal;
 a second digital converter, coupled to the second LPF and arranged to convert the quadrature phase IF signal to a quadrature phase digital signal;
 a complex mixer, coupled to the first digital converter and the second digital converter and arranged to mix the in phase digital signal and the quadrature phase digital signal with the third oscillation frequency to obtain a relative gain difference and a relative phase difference; and
 a statistic module, coupled to the complex mixer and arranged to accumulate the relative gain difference and the relative phase difference to calculate the I/Q mismatch that includes an absolute gain difference and an absolute phase difference.

8. The receiver as claimed in claim 7, wherein the compensator receives the in phase baseband signal, quadrature phase baseband signal, absolute gain difference and the absolute phase difference, and obtains an in phase compensation result and a quadrature phase compensation result as follows:

$$I'_2 = I_2/(1+\epsilon)$$

$$Q'_2 = -I_2 \cdot \tan\theta/(1+\epsilon) + Q_2/\cos\theta$$

where $\epsilon$ represents the absolute gain difference, $I_2$ represents the in phase baseband signal, $I'_2$ represents the in phase compensation result and $Q'_2$ represents the quadrature phase compensation result; and
 the compensator further comprises an adder to add the in phase compensation result and quadrature phase compensation result together to generate the baseband signal.

9. The receiver as claimed in claim 7, wherein the complex mixer further comprises:
 a first multiplier, arranged to mix a third in phase oscillation signal having the third oscillation frequency with the in phase digital signal;
 a second multiplier, arranged to mix a third quadrature phase oscillation signal having the third oscillation frequency with the quadrature phase digital signal;
 a first adder, arranged to add mixed results of the first multiplier and the second multiplier together; and
 a third multiplier, arranged to multiply a summation of the first adder by the in phase digital signal to generate the relative gain difference.

10. The receiver as claimed in claim 9, wherein the statistic module comprises:
 a first accumulator, coupled to the third multiplier and arranged to accumulate all of the relative gain differences generated within a time period, wherein the time period relates to the frequency of the test signal;
 a first normalizer, coupled to the first accumulator and arranged to normalize the accumulated result of the first accumulator according to the amplitude of the test signal; and
 a first scaler, coupled to the first normalizer and arranged to adjust a normalized result of the first normalizer according to a ratio of the third oscillation frequency to the second oscillation frequency to generate the absolute gain difference.

11. The receiver as claimed in claim 7, wherein the calibration module further comprises:
 a fourth multiplier, arranged to mix the third in phase oscillation signal with the quadrature phase IF signal;
 a fifth multiplier, arranged to mix the third quadrature phase oscillation signal with the in phase IF signal;
 a second adder, arranged to add mixed results of the fourth multiplier and the fifth multiplier together; and
 a sixth multiplier, arranged to multiply a summation of the second adder by the in phase digital signal to generate the relative phase difference.

12. The receiver as claimed in claim 11, wherein the statistic module comprises:
 a second accumulator, coupled to the sixth multiplier and arranged to accumulate all of the relative phase differences generated within a time period, wherein the time period relates to the frequency of the test signal;

a second normalizer, coupled to the second accumulator and arranged to normalize the accumulated result of the second accumulator according to the amplitude of the test signal; and a second scaler, coupled to the second normalizer and arranged to adjust a normalized result of the second normalizer according to a ratio of the third oscillation frequency to the second oscillation frequency to generate the absolute phase difference.

13. A wireless signal receiving method receiving a Radio Frequency (RF) signal and generating a baseband signal via an in-phase to quadrature (I/Q) channel, comprising:

in a calibration mode:
providing a test signal to an input of the I/Q channel, wherein the test signal has a frequency and an amplitude;
down converting the test signal according to a first oscillation frequency to generate an Intermediate Frequency (IF) signal at an output of the I/Q channel; and
mixing the IF signal with a third oscillation frequency and performing an accumulating operation to detect an I/Q mismatch; and in a normal mode:
receiving the RF signal and down converting the RF signal according to the first oscillation frequency to generate the IF signal at the output of the I/Q channel; and
down converting the IF signal according to a second oscillation frequency and calibrating the I/Q mismatch to generate the baseband signal.

14. The wireless signal receiving method as claimed in claim 13, wherein the third oscillation frequency is an integer multiple of the second oscillation frequency, and wherein the integer exceeds 2.

15. The wireless signal receiving method as claimed in claim 14, wherein the integer is 16.

16. The wireless signal receiving method as claimed in claim 13, wherein the step of down converting the test signal according to the first oscillation frequency comprises:

providing a first in phase oscillation signal and a first quadrature phase oscillation signal having the first oscillation frequency;
multiplying the first in phase oscillation signal with the test signal and low pass filtering the multiplication result to output an in phase IF signal of the IF signal; and
multiplying the first quadrature phase oscillation signal with the test signal and low pass filtering the multiplication result to output a quadrature phase IF signal of the IF signal.

17. The wireless signal receiving method as claimed in claim 16, wherein the step of down converting the IF signal according to the second oscillation frequency comprises:

providing a second in phase oscillation signal and a second quadrature phase oscillation signal having the second oscillation frequency;
multiplying the second in phase oscillation signal with the in phase IF signal to generate an in phase baseband signal;
multiplying the second quadrature phase oscillation signal with the quadrature phase IF signal to generate a quadrature phase baseband signal; and
performing a calibration operation on the I/Q mismatch, the in phase baseband signal and the quadrature phase baseband signal to generate the baseband signal, accordingly.

18. The wireless signal receiving method as claimed in claim 17, wherein the step of mixing the IF signal with the third oscillation frequency and performing an accumulating operation to detect the I/Q mismatch comprises:

sampling the in phase IF signal to generate an in phase digital signal;
sampling the quadrature phase IF signal to generate a quadrature phase digital signal;
complex mixing the in phase digital signal and the quadrature phase digital signal with the third oscillation frequency to obtain a relative gain difference and a relative phase difference; and
accumulating the relative gain difference and the relative phase difference to calculate the I/Q mismatch that includes an absolute gain difference and an absolute phase difference.

19. The wireless signal receiving method as claimed in claim 18, wherein the step of performing the calibration operation comprises:

receiving the in phase baseband signal, quadrature phase baseband signal, absolute gain difference and the absolute phase difference, and obtaining an in phase compensation result and a quadrature phase compensation result as follows:

$$I'_2 = I_2/(1+\epsilon)$$

$$Q'_2 = -I_2 \cdot \tan\theta/(1+\epsilon) + Q_2/\cos\theta$$

where $\epsilon$ represents the absolute gain difference, $I_2$ represents the in phase baseband signal, $I'_2$ represents the in phase compensation result and $Q'_2$ represents the quadrature phase compensation result; and adding the in phase compensation result and quadrature phase compensation result together to generate the baseband signal.

20. The wireless signal receiving method as claimed in claim 19, wherein the step of complex mixing the in phase digital signal and the quadrature phase digital signal with the third oscillation frequency to obtain the relative gain difference comprises:

multiplying a third in phase oscillation signal having the third oscillation frequency with the in phase digital signal to generate a first multiplication result;
multiplying a third quadrature phase oscillation signal having the third oscillation frequency with the quadrature phase digital signal to generate a second multiplication result;
adding the first and the second multiplication results together to generate a summation; and
multiplying the summation by the in phase digital signal to generate the relative gain difference.

21. The wireless signal receiving method as claimed in claim 20, wherein the step of detecting the I/Q mismatch comprises:

accumulating all of the relative gain differences generated within a time period to obtain a first accumulated result, wherein the time period relates to the frequency of the test signal;
regulating the first accumulated result according to the amplitude of the test signal to obtain a first normalized result; and
adjusting the first normalized result according to a ratio of the third oscillation frequency to the second oscillation frequency to generate the absolute gain difference of the I/Q mismatch.

22. The wireless signal receiving method as claimed in claim 19, wherein the step of complex mixing the in phase digital signal and the quadrature phase digital signal with the third oscillation frequency to obtain the relative gain difference comprises:

multiplying the third in phase oscillation signal with the quadrature phase IF signal to generate a third multiplication result;

multiplying the third quadrature phase oscillation signal with the in phase IF signal to generate a fourth multiplication result;

adding the third and the fourth multiplication results together to generate a second summation; and multiplying the second summation by the in phase digital signal to generate the relative phase difference.

23. The wireless signal receiving method as claimed in claim 22, wherein the step of detecting the I/Q mismatch further comprises:

accumulating all of the relative phase differences generated within a time period to obtain a second accumulated result, wherein the time period relates to the frequency of the test signal;

regulating the second accumulated result according to the amplitude of the test signal to obtain a second normalized result; and adjusting the second normalized result according to a ratio of the third oscillation frequency to the second oscillation frequency to generate the absolute phase difference of the I/Q mismatch.

* * * * *